United States Patent [19]
Muhlhoff et al.

[11] Patent Number: 5,787,950
[45] Date of Patent: Aug. 4, 1998

[54] RIM, SUPPORTING RING AND ASSEMBLY THEREOF

[75] Inventors: Olivier Muhlhoff, Clermont-Ferrand; Jean-Pierre Pompier, Volvic, both of France

[73] Assignees: Compagnie Generale des Etablissements Michelin; Michelin & Cie, both of Clermont-Ferrand Cedex, France

[21] Appl. No.: 647,936

[22] PCT Filed: Nov. 22, 1994

[86] PCT No.: PCT/EP94/03872

§ 371 Date: May 31, 1996

§ 102(e) Date: May 31, 1996

[87] PCT Pub. No.: WO95/16862

PCT Pub. Date: Jun. 15, 1995

[30] Foreign Application Priority Data

Dec. 8, 1993 [FR] France ...................... 93 14703

[51] Int. Cl.⁶ ...................... B60B 21/02
[52] U.S. Cl. ...................... 152/379.5; 152/381.4; 152/381.5
[58] Field of Search ........... 152/379.3, 379.4, 152/379.5, 381.3, 381.4, 381.5, 381.6, 384, 516, 520; 301/95, 96, 97, 98

[56] References Cited

U.S. PATENT DOCUMENTS

| | | | |
|---|---|---|---|
| 3,405,755 | 10/1968 | Verdier | 152/381.3 |
| 4,246,950 | 1/1981 | Welter | |
| 4,572,265 | 2/1986 | Lescoffit | |
| 4,606,390 | 8/1986 | Shute | 152/381.4 |
| 5,000,241 | 3/1991 | Patecell | |

FOREIGN PATENT DOCUMENTS

| | | | |
|---|---|---|---|
| 0573162 | 12/1993 | European Pat. Off. | |
| 1139619 | 7/1957 | France | |
| 2560121 | 8/1985 | France | |
| 2355491 | 5/1975 | Germany | 152/381.3 |
| 3626012 | 2/1988 | Germany | |

*Primary Examiner*—Russell D. Stormer
*Attorney, Agent, or Firm*—Baker & Botts, L.L.P.

[57] ABSTRACT

An integral rim intended for mounting a tire having at least two beads and including, when viewed in meridian section, at least a first rim seat, a second rim seat, and a rim base which is without a groove. The first rim seat slopes downwardly towards the outside. The second rim seat has a generatrix, the axially inner end of which is on a circle of diameter at least as great as the diameter of the circle on which the axially inner end of the first rim seat is located. The assembly formed by such a rim and a supporting ring for the thread.

17 Claims, 5 Drawing Sheets

RIM, SUPPORTING RING AND ASSEMBLY THEREOF

BACKGROUND OF THE INVENTION

The present invention relates to the production of an integral mounting rim for a tire, preferably with radial carcass, which rim may possibly form, with a supporting ring for the tread and said tire, a rolling assembly which can be used in the event of travelling when the inflation pressure drops abnormally with respect to the nominal pressure of use, called service pressure, when the inflation pressure may even become zero.

The main difficulties encountered when driving with a flat tire or tire with low pressure relate to the risks of unwedging of the beads of the tire, and in particular the unwedging of the bead located on the outside of the tire mounted on the outside of the vehicle. The well-known techniques proposed for avoiding such unwedging, and in particular that consisting of arranging a projection or hump of low height axially on the inside of the outer rim seat, do not seem to give complete satisfaction, and tend to increase the difficulties of mounting and removing tires.

One solution which is capable of being applied to the problem of unwedging of beads is that described in French Patent 1139619, which relates to an assembly formed of a tire and a rim such that the flexible edges of the tire, in contrast to conventional beads, under the effect of the inflation pressure hug tightly the rim stops intended to keep said edges spaced apart from each other. This solution requires a tire structure which is at the very least special and not in conformity with the compromise of properties required for a current tire.

Some prior solutions advocate the addition of a bearing support, integrated or attached and fixed by any available means, to a rim as described previously. Be it with hump or without hump, assemblies comprising rims with bearing support are known, and German application 3626012 and French application 2560121 disclose such assemblies. However, their use has not become widespread because, despite the progress made, there are also difficult mounting problems. The French application referred to above describes a mounting process which makes it possible to eliminate numerous difficulties: the tilting and the ovalisation of one of the beads of the tire permit the passage of the rim, provided with its bearing support on the inside of the tire if said rim is positioned with its axis of rotation perpendicular to the axis of rotation of the tire, the beads then being placed on their respective rim seats with the aid of the mounting grooves located axially on either side of the bearing support.

If the overall width of the mounting rim measured axially between the ends of the two flanges is designated S, $D_J$ is the diameter of the rim measured at the level of the intersection between the rim flange and the frustoconical generatrix of the rim seat, the latter being viewed in meridian section, H' the height of the support measured with respect to the line parallel to the axis of rotation of the rim passing through said point of intersection, and $D_T$ the diameter of the bead of the tire measured on a line parallel to the equatorial plane of the tire, which line passes through the centre of the bead wire, the method described above cannot be applied in the case in which the quantity $2\pi D_T$ is less than $2(D_J+2H'+S)$, which is why it is impossible to have at one's disposal tires having a conventional shape ratio with an effective internal support.

Furthermore, the rims to which these applications relate comprise mounting grooves. A mounting groove, serving for mounting the beads of the tire on their respective rim seats, has a depth and an axial width which is a function of the axial width of the beads, of the internal diameter of any reinforcement rings of said beads, and if applicable of the width of the supporting surface of the rim intended to receive any supporting ring of the tread.

The depth of a groove may in certain cases appear to be excessive in that it greatly reduces the free space intended for the mechanical travelling and in particular braking elements. Likewise, the axial width of a groove may be a well-known obstacle to the axial widening of a supporting ring of a tread, when it is advantageous to use one.

SUMMARY OF THE INVENTION

The object of the present invention is to dispense with any mounting groove(s). To this end, and in accordance with the invention, an integral rim, intended for the mounting of a tire comprising at least two beads, which rim is axially defined by a first rim edge and a second rim edge, spaced apart axially by the rim width S and comprising, when viewed in meridian section, at least a first and a second rim seat, and a rim base, characterised in that the first rim seat has a generatrix, the axially inner end of which is on a circle of diameter greater than the diameter of the circle on which the axially outer end is located, the said first rim seat being extended axially on the outside by a projection or hump of low height, the second rim seat having a generatrix of which the axially inner end is on a circle of diameter at least as great as the diameter of the circle on which the axially inner end of the first rim seat is located, and the rim base, without a mounting groove, having a minimum diameter, which is the diameter of its end which is axially closest to the first rim seat, at least equal to the diameter of any part of the rim included between said end and the first rim edge.

The maximum distance between two diametrically opposed points of the rim base, measured in a plane parallel to the equatorial plane of the rim, is referred to as the diameter of said rim base. The minimum diameter of the rim base is the diameter as defined above and measured in the plane parallel to the equatorial plane passing through its end closest to the first rim seat.

The difference between the diameters of the circles on which the axially inner ends of the rim seats are respectively located is preferably greater than 2 mm.

The first rim seat is extended axially on the outside by a projection or hump of low height, the height of said projection being at all points comparable to the height of the projections or humps which axially extend on the inside the conventional rim seats standardized by the international authorities, such as the T.R.A. or E.T.R.T.O. This projection may have a substantially frustoconical inner wall forming an angle of at least 30° with the axis of rotation of the rim.

According to a first embodiment in accordance with the invention, the axially outer end of the second rim seat is on a circle of a diameter less than the diameter of the circle on which the axially inner end is located, this seat, like the first, being said to be inclined towards the outside.

This second rim seat is then advantageously extended axially on the outside, as in the case of the first rim seat, by a projection of low height having a substantially frustoconical inner wall and forming an angle of at least 30° with the axis of rotation. It is likewise advantageous, in accordance with this first variant of the invention, for the diameter of the circle on which the axially outer end of the second rim seat is located to be greater by at least 2 mm than the diameter of the circle on which the axially inner end of the first rim seat is located.

In accordance with a second variant according to the invention, the axially outer end of the second rim seat is on a circle of diameter at least as great as the diameter of the circle on which the axially inner end of said seat is located. This second seat is then said to be inclined towards the inside, including, by convention, if it is flat.

It may be extended axially on the outside by a rim flange, formed of at least one part substantially perpendicular to the axis of rotation, and the height of which, measured with respect to the end of the seat to which it is adjacent, is comparable to the height of a known rim flange standardized by the international authorities.

Whether the rim according to the invention be provided with a second rim seat inclined towards the inside or inclined towards the outside, it may comprise a rim base provided with a positioning stop for a supporting ring of a tread, said stop being arranged axially between the two ends of the rim base. This positioning stop, with the end of the rim base closest to the axially inner end of the first rim seat, defines a supporting surface of the rim intended to receive the supporting ring of the tread, which ring will itself serve as a stop for the bead intended to be mounted on the first rim seat, and the axial length of which can be selected freely by the designer of the assembly formed by the rim and the supporting ring, for instance as a function of the weight of the assembly.

It is then advantageous for the second rim seat to be axially adjacent on the inside to the generatrix of a protuberance, which generatrix forms an angle of at least 45° open axially towards the inside and radially towards the outside with the axis of rotation of the rim.

In the case of a second rim seat inclined towards the inside, the height of this protuberance, measured with respect to the axially inner end of said seat, is similar to the height of the projections or humps which extend on the inside the current, standardised rim seats. The axially inner wall of said protuberance then preferably has a substantially frustoconical generatrix forming with the axis of rotation of the rim an angle of at most 45° open axially and radially towards the outside.

In the case of a second rim seat inclined towards the outside, the protuberance advantageously has an axially inner wall substantially perpendicular to the axis of rotation of the rim, and the height of the axially outer wall of said protuberance is at most equal to half the height of the axially inner wall, measured with respect to the end of the rim base closest to the second rim seat. The diameter of the circle on which the radially outer end of said protuberance is located is greater than the diameter of any part of the rim comprised between said protuberance and the second rim edge.

A rim according to the invention may also have a rim base acting as a supporting surface, suitable for receiving a supporting ring for the tread, the axial width of which at its base is equal to the axial distance between the two beads of the tire, mounted on its rim and inflated to its service pressure; the supporting ring then serves as a stop for the two tire beads. The height of the protuberance, axially adjacent to the axially inner end of the second rim seat, may then be of low value, and even zero.

It is of low value, for instance, in the case of a second rim seat inclined towards the outside. "Height of low value" is to be understood to be a height at most equal to the height of the standardized projections, and the radially outer end of said protuberance still being located on the circle of maximum diameter of the rim. The axially inner wall of the protuberance may then have a frustoconical generatrix forming an angle of at most 30° open radially and axially towards the outside with the axis of rotation.

It is preferably zero in the case of a second rim seat inclined towards the inside, the axially inner end of said seat then being merged with the end of the closest rim base, or being in the plane parallel to the equatorial plane which contains the end of said rim base.

In all the cases mentioned above, the rim seats preferably have frustoconical generatrices forming an angle of between 0° and 30° with the axis of rotation of the rim. The generatrices of said seats may have angles which are equal or different.

The rim base will preferably have a generatrix which is rectilinear, and furthermore advantageously parallel to the axis of rotation of the rim, the rim base then being cylindrical. The minimum diameter of the cylindrical rim base may be equal to the diameter of the circle on which the axially inner end of the first rim seat [is located], said diameter defining the nominal diameter of the rim.

The height of a projection, axially on the outside of a rim seat, is advantageously at most 2.25% of the nominal diameter of the rim.

An assembly, formed by a rim and a supporting ring of the tread, is in accordance with the invention when the rim of the assembly is a rim such as described above and the supporting ring is ovalisable, preferably circumferentially inextensible and able to be slipped on to the rim base.

The maximum effectiveness of the assembly according to the invention is obtained for great heights of supporting ring, preferably greater than 40% of the height of the carcass reinforcement of the tire intended to be mounted with said ring. This particular feature offers the advantage of prolonging travelling with a flat tire, that is to say, at zero inflation pressure, without causing, in the case of a conventional structure of the sidewalls of the tire, degeneration at the level thereof, of the carcass reinforcement and even of the crown reinforcement.

The supporting ring can be slipped on easily owing to the special characteristics of the mounting rim, and if its minimum internal diameter is selected to be at least equal to the minimum diameter of the rim base, and at most greater than said diameter by 2 mm, its internal generatrix being parallel to the generatrix of said rim base. In order to avoid possible disadvantages due to the effect of centrifugal forces at high speed, the internal generatrix of the ring is distant from the generatrix of the rim base by at most 2 mm.

The supporting ring, which is ovalisable and inextensible circumferentially, is preferably made of vulcanised rubber in annular form, said vulcanized rubber being reinforced by reinforcements of wires or cables arranged circumferentially, to within about 2°. Such a constitution permits easy manipulation, while ensuring inextensibility under all travelling conditions and in particular under the action of centrifugal forces due to high speed.

Generally, the supporting ring, when viewed in meridian section, has a quasi-rectangular shape with two lateral walls substantially perpendicular to the axis of rotation of the assembly. It may be advantageous for the supporting ring to have a different shape, when viewed in meridian section, and in the event that said supporting ring has a base of axial width less than the axial distance between the two beads. Said shape may be characterised in that the lateral wall closest to the second rim seat is such that the axial distance between said wall and the plane parallel to the equatorial plane passing through the axially inner end of the second rim seat increases as a function of the height of the supporting ring, to reach its maximum and become very close to said parallel plane at a radial distance from the rim base substantially equal to the height of the ring.

Apart from the assembly according to the invention solving the problem of unwedging of the beads whilst minimising the problems of mounting of the tires in all the cases usually encountered, the assembly formed by a rim, as described above and in accordance with the invention, and a tire having beads which have shapes adapted to the shape of the rim offer other advantages.

In fact, although the ovalization of the beads of a tire is a necessary operation for mounting said tire, and although the constitution of certain reinforcing rings of beads, in particular the bead wires of the "braided" type, permit ready ovalisation, this manipulation must not exceed certain limits. In particular, too-extensive ovalization, which is the case in the prior art described, greatly affects the rigidity of a bead wire, be it under tensile force, bending stress on edge, bending stress in its plane, which is expressed in certain cases of the tire while travelling by impaired properties of resistance to unwedging, tightness, fatigue strength of the beads and resistance to blowouts. These properties are preserved by the invention.

DESCRIPTION OF THE DRAWINGS

The invention will be better understood with reference to the drawing appended to the description, illustrating non-limitative examples of embodiment of a rim intended for the mounting of a 185/60-14 tire, in which.

DESCRIPTION OF PREFERRED EMBODIMENTS

Figure 1:
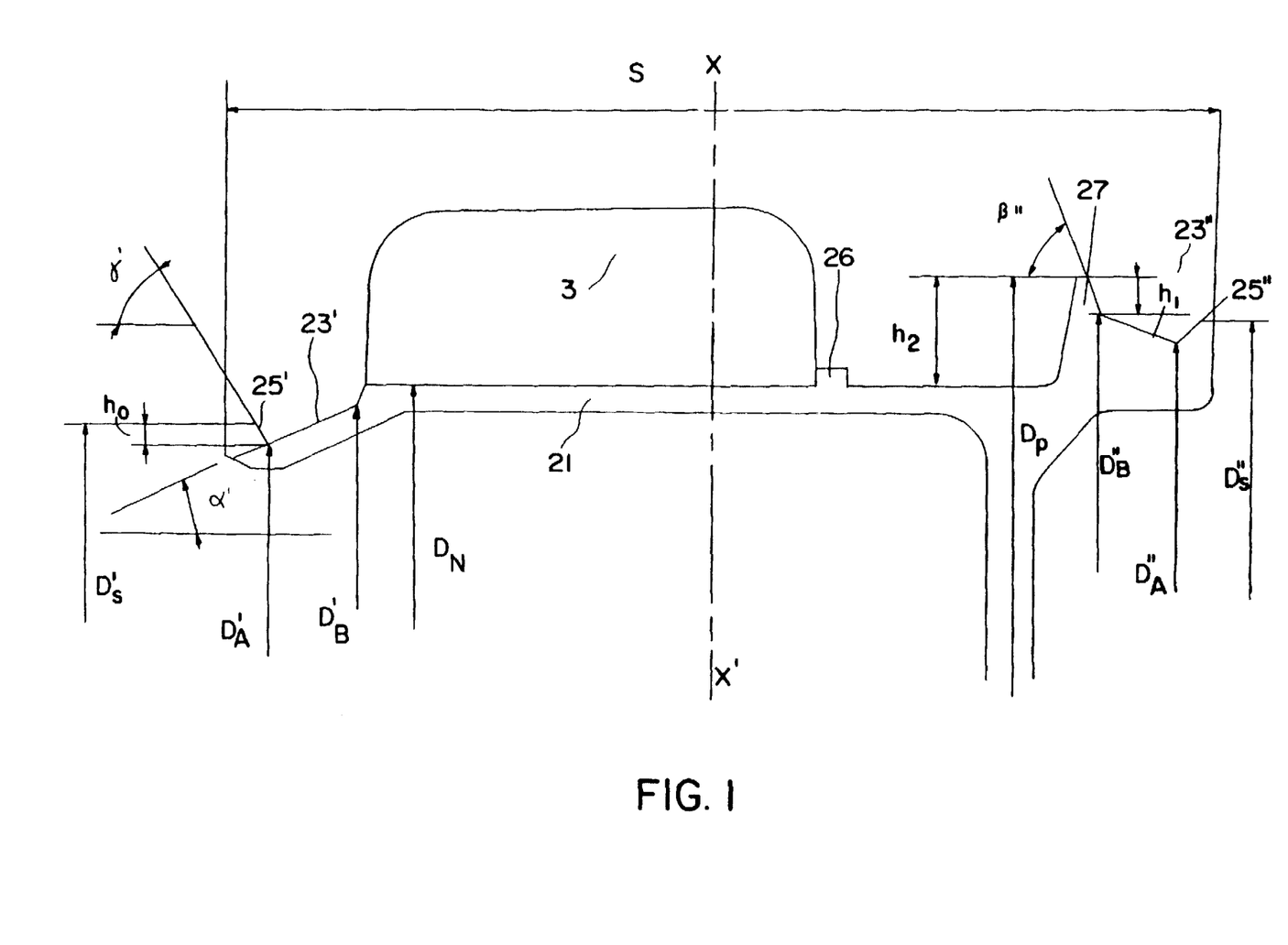
FIG. 1 shows a diagram, viewed in meridian section, of a first rim variant, according to the invention and provided with a supporting ring for the tread.

The rim 2 shown in FIG. 1, of axial width S, measured between its ends or edges furthest from the equatorial plane XX', is formed mainly by two rim seats 23' and 23" and a rim base 21, without a mounting groove. The two rim seats 23' and 23" have axially outer ends on circles, the diameters $D'_A$ and $D''_A$ of which are smaller than the diameters $D'_B$ and $D_B$ of the circles on which the axially inner ends are located. These two seats have frustoconical generatrices which form with the axis of rotation of the rim an angle $\alpha'$, which is identical for the two generatrices, of 6°. The diameter $D''_B$ of the axially inner end of the second rim seat 23" is greater than the diameter $D'_B$ of the axially inner end of the first rim seat 23'. The two rim seats 23' and 23" are axially extended on the outside, respectively by two projections 25' and 25" of low height $h_0$, equal to 3.5 mm in the example described, and respectively of diameters $D'_S$ and $D''_S$, which are smaller than the diameters $D'_B$ and $D''_B$ of the axially inner ends of the seats 23' and 23". The two projections 25' and 25" have internal frustoconical walls, said walls forming with the axis of rotation of the rim the same angle $\gamma$, of 45°. Axially on the inside, the first rim seat 23' is joined to the rim base 21 by means of a frustoconical generatrix, the diameter $D_N$ of the cylindrical rim base 21 being slightly greater than the diameter $D'_B$ of the axially inner end of the first seat 23'. Said rim base 21 is provided with a positioning stop 26, acting, as its name indicates, to position axially a supporting ring 3 of the tread, of axial width smaller than the axial distance between the two axially inner ends of the rim seats 23' and 23" which can be slipped on directly over the first seat. Between the axially inner end of the second rim seat 23" and the end of the rim base 21 closest to said seat 23", there is located a protuberance 27. Said protuberance 27 has, firstly, an outer frustoconical generatrix forming with the axis of rotation an angle $\beta$", open axially towards the inside and radially towards the outside and equal to 45°, and, secondly, an inner generatrix substantially perpendicular to the axis of rotation of the rim. "Substantially perpendicular" is intended to mean a generatrix forming with the axis of rotation of the rim an angle open axially and radially towards the outside of between 75° and 90°. The protuberance 27 has its radially outer end on a circle of diameter $D_P$, which diameter is greater than the diameter of any part located between said end and the rim edge corresponding to the seat 23", and in particular greater than the diameters $D''_B$, $D''_A$ and $D''_S$, which of the projection 25". The difference $2h_1$ between the diameters $D_P$ and $D''_B$, equal to 9 mm in the example described, is less than half the difference $2h_2$ between the diameters $D_P$ and $D_N$, $h_2$ being equal to 10 mm.

Figure 2:
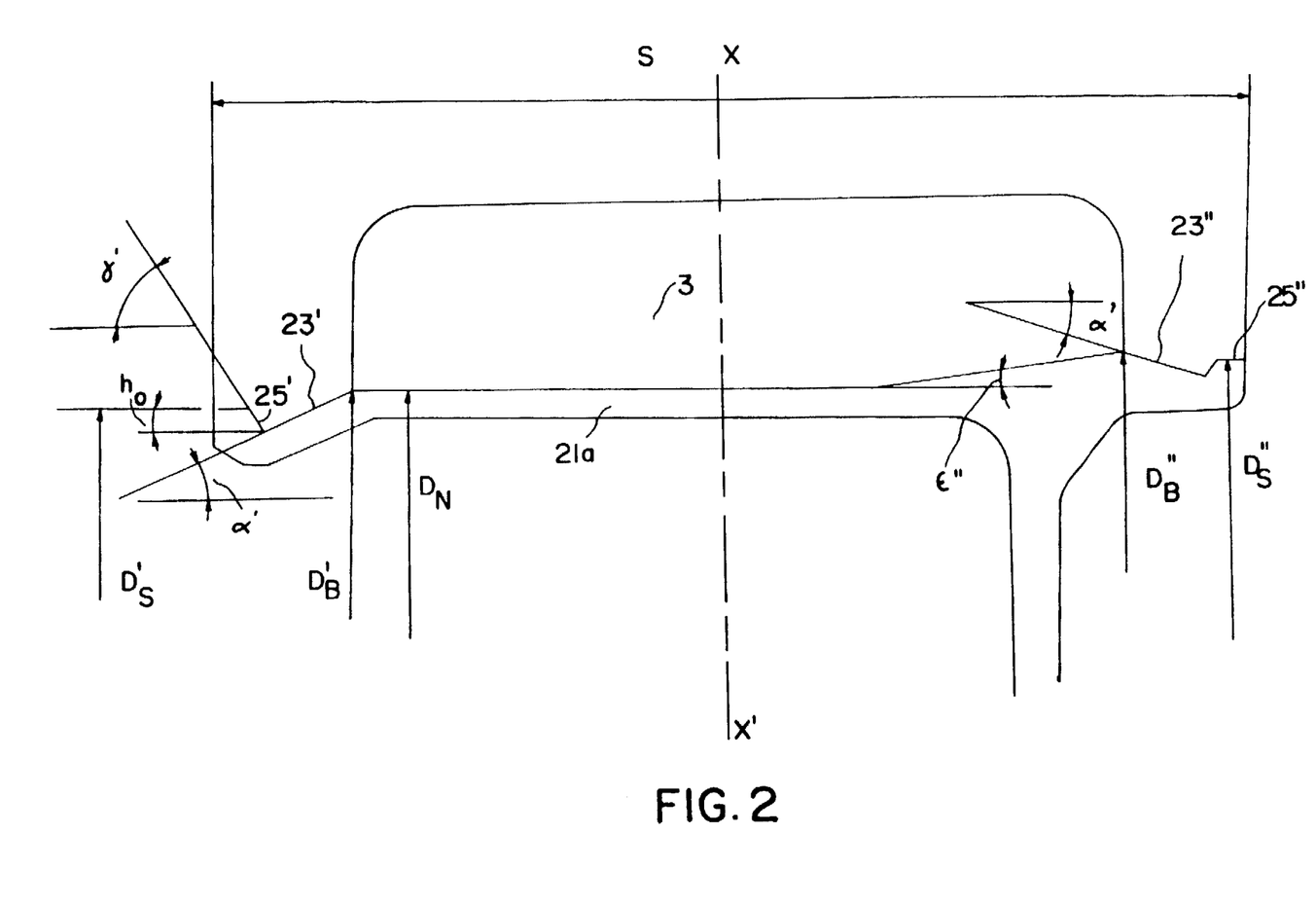
FIGS. 2 to 4 show diagrams of a second, third and fourth variant respectively of a rim according to the invention.

The rim shown in FIG. 2 differs mainly from that shown in FIG. 1 by the fact that the rim base 21a is in its entirety a supporting surface suitable for receiving a supporting ring 3 of a tread. The rim base 21a is not completely cylindrical, but comprises in part a frustoconical generatrix forming with the axis of rotation of the rim an angle $\epsilon$" which is open axially and radially towards the outside, of low value, equal to 10° in the example described. Said frustoconical generatrix of the rim base 21a is axially adjacent to the axially inner end of the second rim seat 23'", the diameter $D''_B$ of said end always being greater than the diameter $D'_B$ of the axially inner end of the first rim seat 23', which diameter itself is equal to the minimum diameter $D_N$ of the rim base 21a.

The ring 3 then acts as an internal shoulder for holding each bead of the tire in a manner resistant to unwedging.

Figure 3:
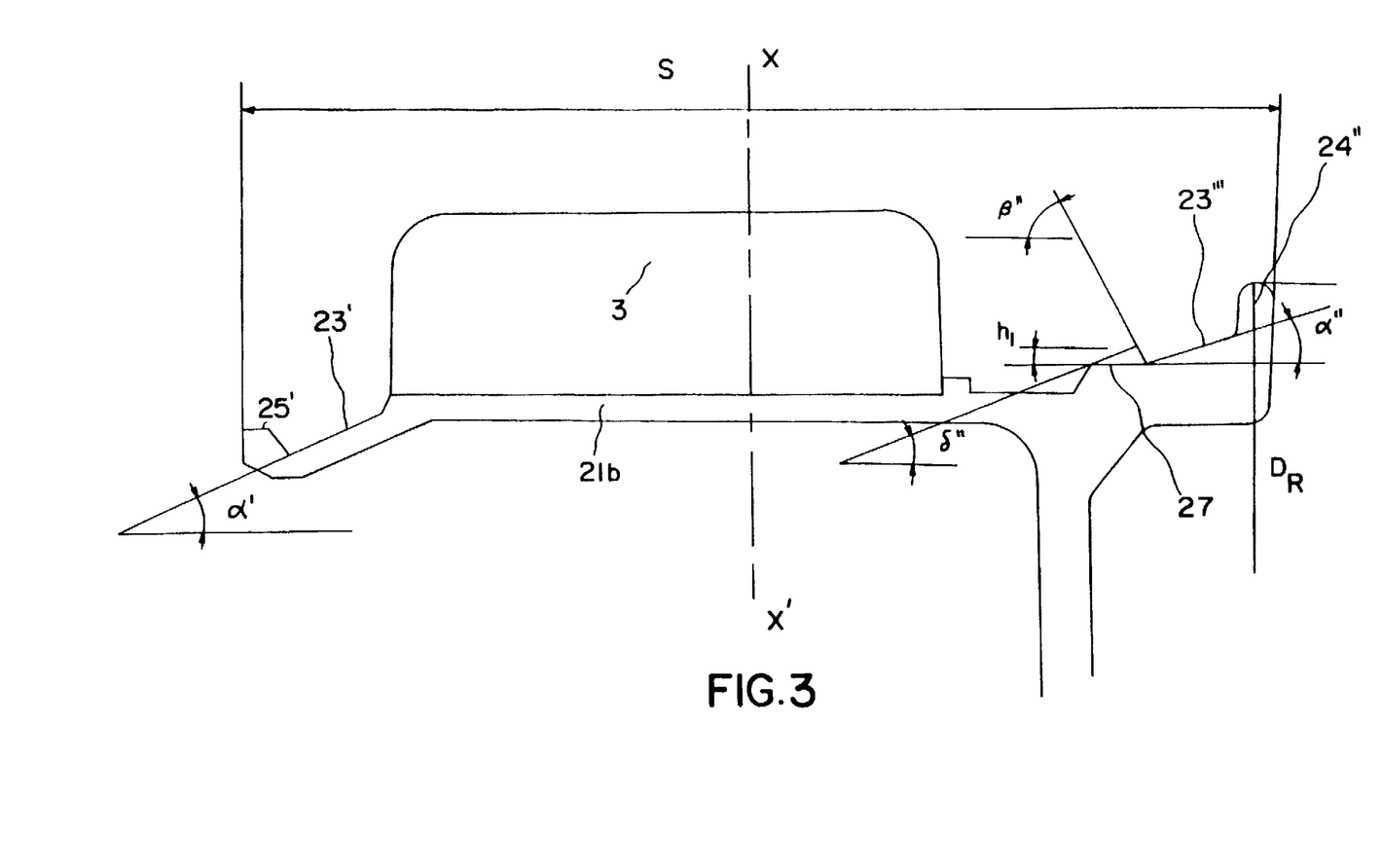

The rim shown in FIG. 3 differs from that shown in FIG. 1 by the presence of a second rim seat 23'" inclined towards the inside. In fact, the second seat 23'" has an axially inner end located on a circle of diameter smaller than the diameter of the circle on which the axially outer end is located. This second rim seat 23'" has a frustoconical generatrix forming with the axis of rotation of the rim an angle $\alpha$", open axially and radially towards the outside, of less than the angle $\alpha'$ which the generatrix of the first rim seat 23' forms with said axis of rotation, this solution making it possible to modify the clamping on the rim of the corresponding bead of the tire. The seat 23'" is extended axially on the outside by a rim flange 24" having an inner wall perpendicular to the axis of rotation and having a radially outer end, the diameter $D_R$ of which is the maximum diameter of the rim 2. Axially on the inside, the second rim seat 23'" is extended by a protuberance 27, the height $h_1$ of which is similar to the height of the projections or humps normally used on current standardized rims, referred to as "with unwedging-resistant profile" and bearing names such as "Hump", "Double Hump", "Flat Hump", "Double Flat Hump", "Asymmetric Hump" etc. The outer generatrix of said projection forms with the axis of rotation of the rim an angle $\beta$" of 45°, while the inner generatrix of said projection 27 forms with said axis of rotation an angle $\delta$" open axially and radially towards the outside of 30°.

Figure 4:
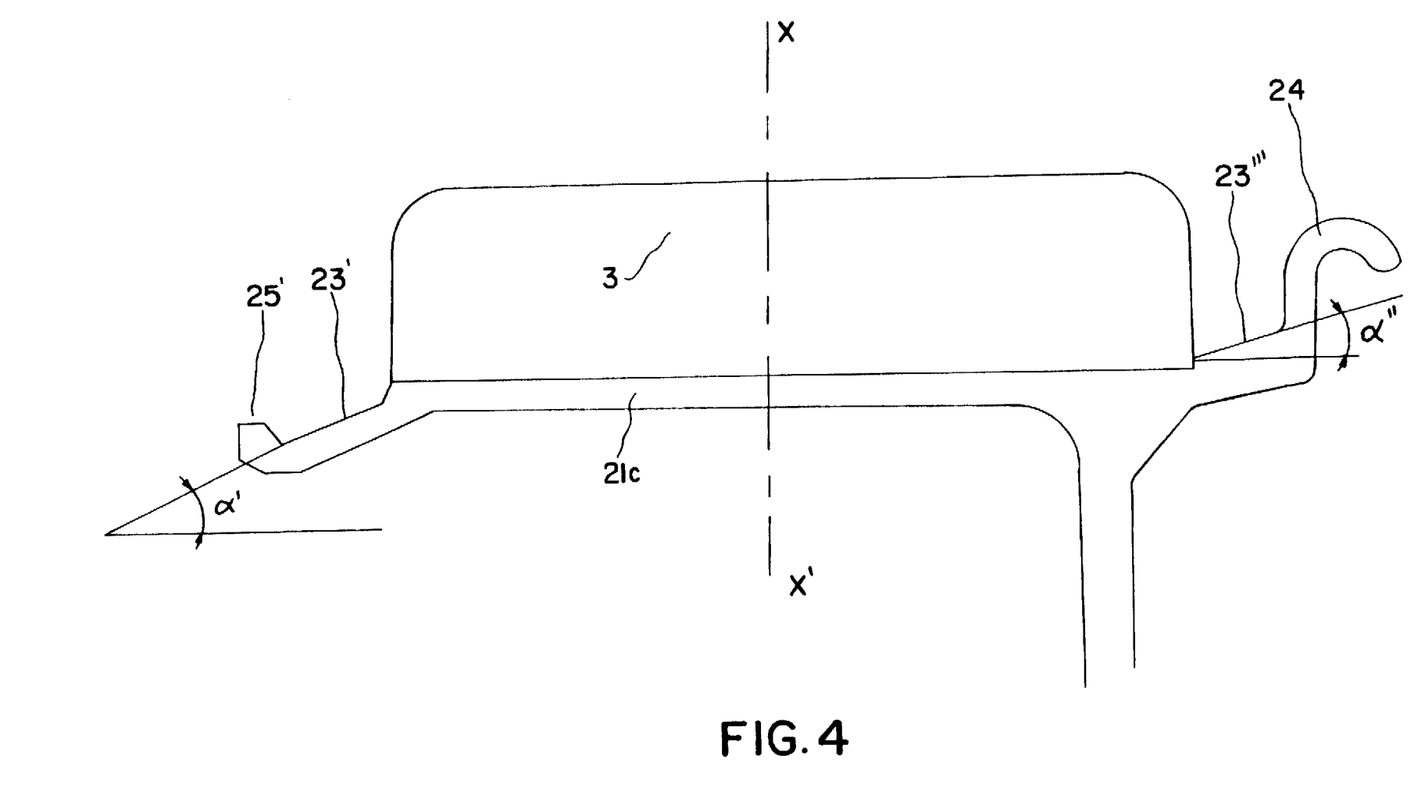

The rim shown in FIG. 4 is very simple. The configuration of the first rim seat 23' is unchanged with respect to the first rim seats described; the rim base 21c is cylindrical and occupies the entire axial distance between the axially inner ends of the two rim seats 23' and 23'"; the second rim seat 23'" is a seat inclined towards the inside and its generatrix forms, with the axis of rotation of the rim and as in the example illustrated in FIG. 3, an angle α" which is smaller than the angle α' which the generatrix of the first rim seat 23' forms with said axis. The second rim seat 23'" is extended axially on the outside by a rim flange 24 provided with a hook, the configuration of which is similar in all points to that of a known, standardized rim flange. On the inside, the second rim seat 23'" has its axially inner end in the plane parallel to the equatorial plane which also contains the end of the rim base 21c, and the supporting ring 3 rests on the entire axial width of the rim base 21c.

Figure 5:
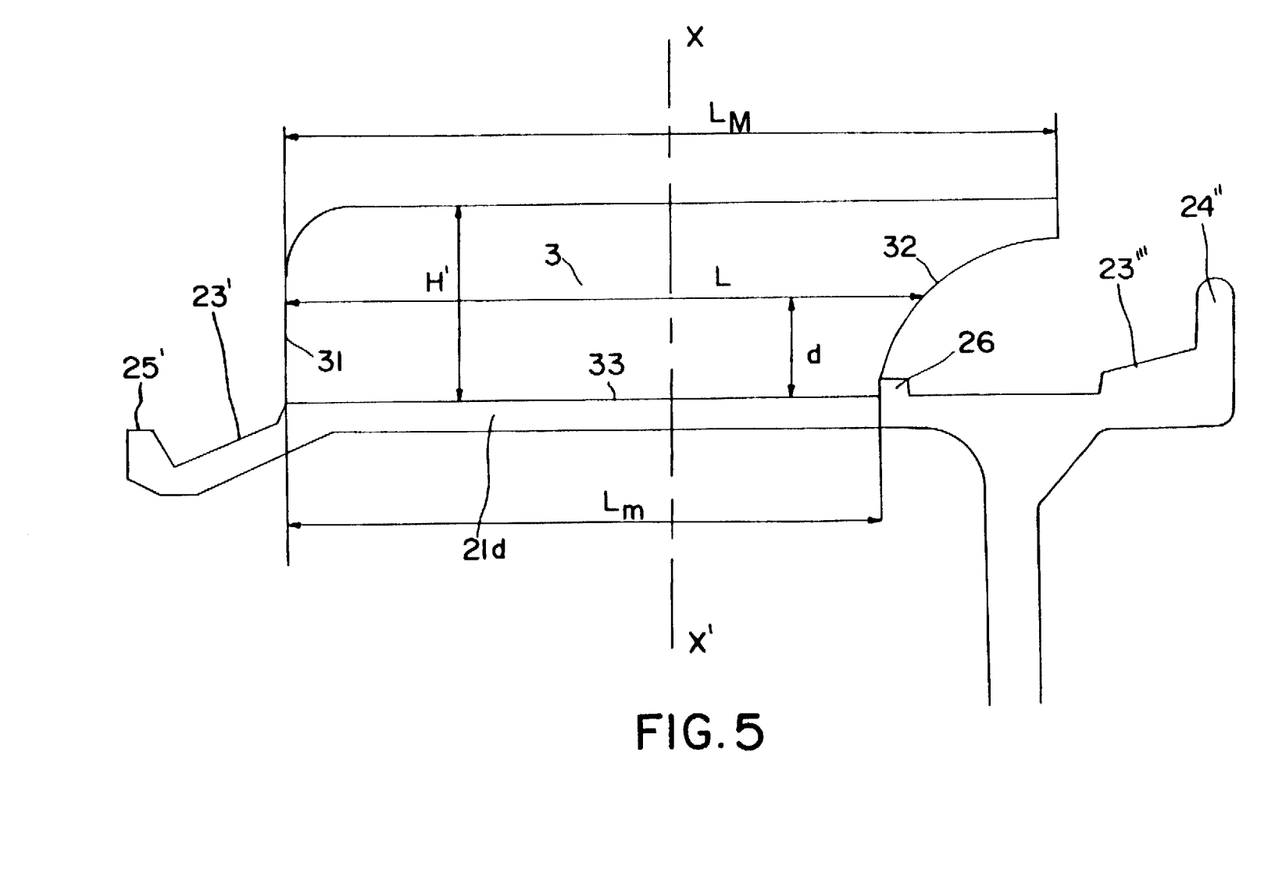
FIG. 5 shows a fifth variant of a rim, provided with a supporting ring having an adapted shape.

FIG. 5 shows an assembly formed of a rim according to the invention and a supporting ring 3 of the tread, having a special shape, when viewed in meridian section. The rim is substantially identical to the rim shown in FIG. 3, in which the protuberance 27 has been omitted, the axially inner end of the second rim [seat] 23'" being adjacent to the end of the rim base 21d closest to said seat 23'". As for the supporting ring 3, having a base 33 of axial width $L_m$ which is less than the axial distance between the two ends of the rim base 21d, the latter having a positioning stop 26, it has, firstly, a lateral wall 31, closest to the first rim seat 23', substantially perpendicular to the axis of rotation of the rim, and, secondly, a lateral wall 32, closest to the second rim seat 23'", such that the axial width L of the ring, measured on a straight line parallel to the axis of rotation, increases regularly from the minimum value $L_m$ to a maximum value $L_M$, as a function of the radial distance d measured from the rim base 21d, said maximum width $L_M$ being attained for a ring height substantially equal to 90% of the total height H' of the ring 3. This latter solution makes it possible, as described above, to dispense with the protuberance 27, while avoiding the unwedging of the bead intended to be mounted on the second rim seat, the sidewall corresponding to said bead being able to rest on the lateral wall of the supporting ring.

We claim:

1. An integral rim for a tire having at least two beads, the rim comprising, when viewed in meridian section, a first rim edge and a second rim edge spaced apart axially by the rim width S, a first rim seat, a second rim seat and a rim base between the rim seats, the first and second rim seats each having inner and outer ends, the inner ends being more remote from the corresponding rim edge, the first rim seat having a generatrix with axially inner and outer ends, the axially inner and outer ends of the generatrix of the first rim seat being on circles of different diameter, the diameter of the circle of the axially inner end being greater than the diameter of the circle of the axially outer end, a hump on the outer end of the first rim seat, the second rim seat having a generatrix having axially inner and outer ends, the axially inner end of the generatrix of the second rim seat being on a circle of diameter greater than or equal to the diameter of the circle on which the axially inner end of the first rim seat is located, and the rim base, being without a mounting groove and having a minimum diameter, which is the diameter of its end which is axially closest to the first rim seat, equal to or greater than the diameter of any part of the rim included between said end and the first rim edge.

2. A rim according to claim 1 in which said rim base is provided with a positioning stop for a supporting ring for the tread, said stop being arranged axially between the two ends of the rim base, and defining, with the end of the rim base closest to the axially inner end of the first rim seat, a supporting surface intended to receive the supporting ring for the tread, which ring serves as a stop for the tire bead intended to be mounted on the first rim seat.

3. An assembly, formed by a rim and a supporting ring for the tread, in which the assembly comprises a rim according to claim 2 and a supporting ring having a base of axial width $L_m$ less than the axial distance between the two ends of the rim base, having, firstly, a lateral wall closest to the first rim seat, substantially perpendicular to the axis of rotation of the rim, and, secondly, a lateral wall closest to the second rim seat, such that the axial width L of the ring, measured on a straight line parallel to the axis of rotation, increases regularly from the minimum value $L_m$ to a maximum value $L_M$, as a function of the radial distance d measured from the rim base, said maximum width $L_M$ being attained for a height of the ring substantially equal to 90% of the total height H' of the ring.

4. A rim according to claim 2, including a protuberance axially adjacent to the inner end of the second rim seat and having a generatrix which forms an angle β" of at least 45° with the axis of rotation of the rim in the direction of the rim seat.

5. A rim according to claim 4, in which the second rim seat is inclined towards the the outer end and the protuberance has an axially inner wall substantially perpendicular to the axis of rotation of the rim, the height $h_1$ of the axially outer wall of said protuberance being less than half the height $h_2$ of its axially inner wall, measured with respect to the end of the rim base closest to the second rim seat, and the diameter $D_p$ of the circle on which the radially outer end of said protuberance is located then being greater than the diameter of any part of the rim comprised between said protuberance and the second rim edge.

6. A rim according to claim 4, in which the second rim seat is inclined towards the protuberance, and in which the height of the protuberance, measured with respect to the axially inner end of said second seat, is low and similar to the height of the humps which are located adjacent the inner ends of current, standardized rim seats.

7. A rim according to claim 6, in which the protuberance has an axially inner wall which has a substantially frustoconical generatrix forming with the axis of rotation of the rim an angle δ" of at most 45° open axially and radially towards the outer end of the second rim seat.

8. A rim according to claim 1 in which the rim base is suitable for receiving a supporting ring for the tread, the axial width of which ring at its base is equal to the axial distance between the two beads of the tire, mounted on a rim and inflated to its service pressure, and in which the second rim seat is inclined towards its outer end, the inner end of said rim seat being extended axially by a first frustoconical generatrix forming with the axis of rotation or the rim an angle β" of at least 45°, of height $h_1$, and the radially outer end of which is on the circle of maximum diameter of the rim, said generatrix being extended axially by a second frustoconical generatrix forming with the axis of rotation an angle ε" of at most 30° open radially and axially in the direction of the second rim seat.

9. A rim according to claim 8, which the height $h_1$ of the first generatrix is zero.

10. A rim according to claim 1, in which the rim base is suitable for receiving a supporting ring for the tread, the axial width of which at its base is equal to the axial distance between the two beads of a tire mounted on a rim and inflated to its service pressure, and in which the second rim seat is inclined towards its inner end, the axially inner end of said seat being in the same plane parallel to the equatorial plane as the end of the rim base closest to said second seat.

11. A rim according to claim 1, in which the rim seats have frustoconical generatrices forming angles α' and α" of between 0° and 30° with the axis of rotation of the rim.

12. A rim according to claim 1, in which the rim base has a rectilinear generatrix parallel to the axis of rotation of the rim, the rim base then being cylindrical, and the minimum diameter $D_N$ of which is equal to the diameter $D'_B$ of the circle on which the axially inner end of the first rim seat is located.

13. An assembly, formed by a rim and a supporting ring for the tread, in which the assembly comprises a rim according to claim 1 and a supporting ring for the tread which supporting ring is circumferentially inextensible and able to be made oval to facilitate slipping it on to the rim base.

14. A rim according to claim 1 in which the diameter of the circle of the axially outer end of the generatrix of the second rim seat is less than the diameter of the circle on which the axially inner end of the generatrix of the second rim seat is located.

15. A rim according to claim 14 including an outward hump on the outer end of the second rim seat.

16. A rim according to claim 1 in which the axially outer end of the generatrix of the second rim seat is on a circle of diameter equal to or more than the diameter of the circle on which the generatrix of the axially inner end of said second seat is located.

17. A rim according to claim 16 including a rim flange on the outer end of the second rim seat which includes a part which extends substantially perpendicular to the axis of rotation of the rim.

* * * * *

UNITED STATES PATENT AND TRADEMARK OFFICE
CERTIFICATE OF CORRECTION

PATENT NO. : 5,787,950
DATED : August 4, 1998
INVENTOR(S) : Olivier Muhlhoff et al.

It is certified that error appears in the above-indentified patent and that said Letters Patent is hereby corrected as shown below:

Col. 5, line 47, "$D_B$" should read --$D''_B$--;

Col. 5, line 61, "$\gamma$." should read --$\gamma'$,--;

Col. 6, line 19, "which of" should read --which are the diameters of--;

Col. 8, line 55, "claim 8, which" should read --claim 8, in which--.

Signed and Sealed this

Ninth Day of November, 1999

Attest:

Q. TODD DICKINSON

Attesting Officer

Acting Commissioner of Patents and Trademarks